United States Patent [19]

Letemps et al.

[11] Patent Number: 4,985,059
[45] Date of Patent: Jan. 15, 1991

[54] METHOD AND APPARATUS FOR POSITIONING A GLASS SHEET TRAVELING ON A CONVEYOR

[75] Inventors: Bernard Letemps, Thourotte; Philippe Dereims, Compiegne, both of France

[73] Assignee: Saint-Gorbain Vitrage International, Courbevoie, France

[21] Appl. No.: 495,638

[22] Filed: Mar. 19, 1990

[30] Foreign Application Priority Data

Mar. 24, 1989 [FR] France ................................ 89 03935

[51] Int. Cl.$^5$ ............................................. C03B 35/16
[52] U.S. Cl. ........................................ 65/62; 65/106; 65/158; 65/181; 65/273; 198/394
[58] Field of Search .................... 65/62, 106, 158, 160, 65/163, 181, 273; 198/394

[56] References Cited

U.S. PATENT DOCUMENTS

| | | | |
|---|---|---|---|
| 4,493,412 | 1/1985 | Krehnovi ............................ | 198/434 |
| 4,775,404 | 10/1988 | Klempner et al. .................... | 65/273 |
| 4,802,904 | 2/1989 | Boutier et al. ........................ | 65/106 |
| 4,838,920 | 6/1989 | Blasquez-Gonzales et al. ..... | 65/106 |
| 4,895,244 | 1/1990 | Flaugher et al. ..................... | 198/394 |

*Primary Examiner*—Joye L. Woodard
*Attorney, Agent, or Firm*—Oblon, Spivak, McClelland, Maier & Neustadt

[57] ABSTRACT

A beam carries two abutments and is moveable on the conveying direction of the conveyor. Starting from rest, the beam is accelerated to a speed less than that of the glass sheet moving on the conveyor, so that the glass sheet contacts the abutments while both are moving along the conveyor. Once the glass sheet is correctly oriented, the beam is accelerated and raised to permit the passage of the glass sheet. The beam is then retracted to the initial position for the next cycle of operation.

11 Claims, 2 Drawing Sheets

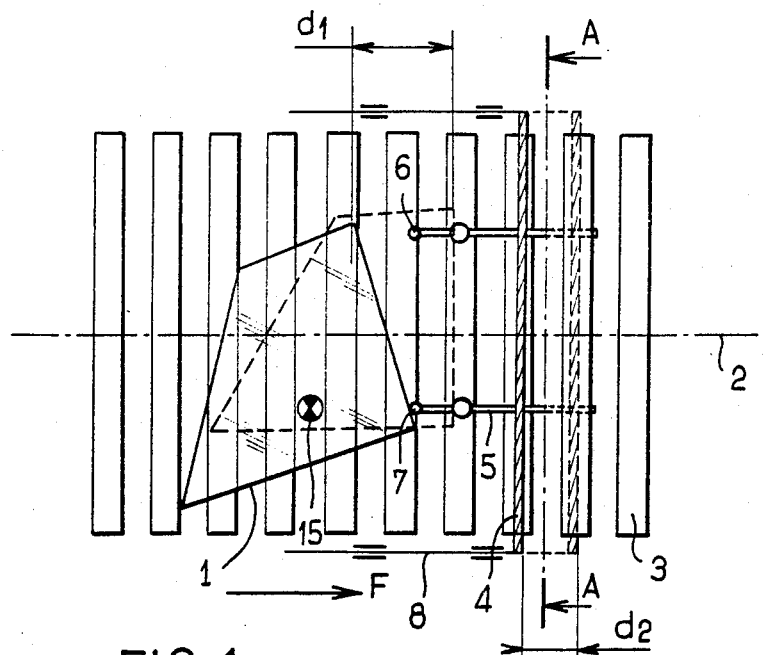
FIG_1
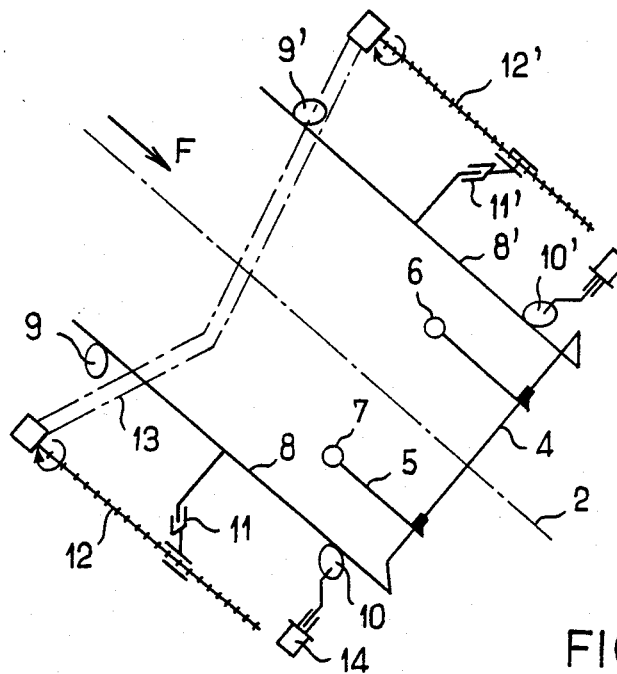
FIG_2

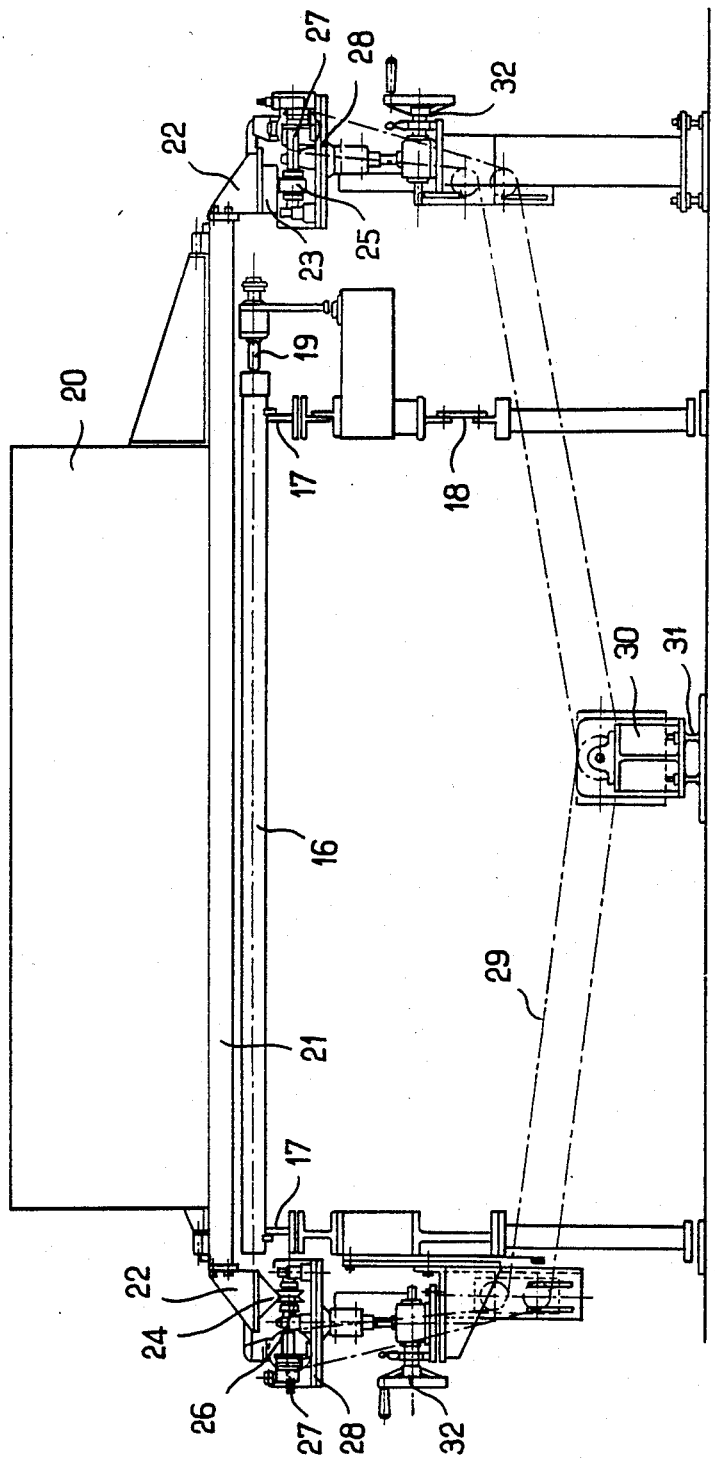
FIG_3

METHOD AND APPARATUS FOR POSITIONING A GLASS SHEET TRAVELING ON A CONVEYOR

BACKGROUND OF THE INVENTION

1. Field of the Invention

The invention relates to the positioning of a glass sheet traveling on a conveyor, particularly a glass sheet heated to beyond its softening point with a view to its cambering and/or a heat treatment for modifying certain of its mechanical characteristics. The invention more particularly applies to the production of glass plates for motor vehicles.

2. Background of the Related Art

In order to supply a glass sheet with good conformity of camber and a satisfactory optical quality, it is important that the glass sheet is correctly positioned prior to being taken up by the cambering and/or heat treatment tools. However, a glass sheet heated to beyond its softening point cannot be held by grippers or other gripping members, unless one is willing to accept the marks necessarily left behind by them. It is also necessary to position to glass sheet relative to the tools prior to the heating thereof, i.e. the tools must be stopped for an extremely long time, which leads to very high productions costs.

These problems of gripper marks and the stopping of tools are reduced in the case of cambering and/or heat treatment processes in which the first stage, namely the heating of the glass sheet, takes place in a furnace traversed by the glass sheets, e.g. on a roller bed. However, the positioning problem is not solved, because the travel speeds and lengths of the furnaces are such that two successive glass sheets do not always have strictly the same trajectories. These trajectory differences can lead to two types of faults, namely sliding perpendicular to the axis of the conveyor and rotation with respect to said axis and which are respectively obviated by lateral positioning means and frontal positioning means.

As stated in European Patent Application No. EP-A-267 120, lateral positioning may be obtained by means of guide bars which move together while advancing in the forward movement direction of the conveyor and which define a passage for the glass sheet. The glass rubs against these bars, but is not stopped by them.

However, as glass sheets intended for motor vehicle windows are never formed by rectangular plates and instead most always have a length varying from one end to the other of the window, said lateral positioning is not adequate and must be completed by a frontal positioning which, according to EP-A-No. 267 120, involves a glass sheet stopping phase. In order to give the glass sheet the desired orientation, a stop means is positioned in its path and which may be one constituted by two abutments, which are necessarily struck by one end of the leading edge of the sheet and maintained in place for an adequate period of time to enable the glass to be reoriented by the conveyor continuing to move the glass sheet. For as long as the glass sheet is at least partly stopped by the stop means, it always rubs at the same point on the rollers, which can then leave behind an impression on the glass which, due to its high temperature, is very easily marked. Therefore the frontal positioning is the source of numerous optical defects.

SUMMARY OF THE INVENTION

An object of the invention is a new method for the frontal positioning of a glass sheet, which minimizes friction of the glass against the rollers and consequently the risk of marking.

The above, and other, objects are achieved according to the invention which comprises an apparatus for positioning a glass sheet moving on a conveyor. The apparatus includes a beam carrying stop means and extending across the conveyor at a position such that a glass sheet moving on the conveyor may contact the stop means and be prevented from movement along the conveyor beyond the stop means, and means attached to opposite ends of the beam for moving the beam in the direction of movement of the glass sheet on the conveyor.

According to another feature of the invention, there is provided a process for positioning a glass sheet moving on a conveyor. The process comprises the steps of moving stop means along the conveyor in the direction of movement of the glass sheet and at a speed lower than that of the glass sheet, the moving stop means being positioned such that a leading edge of the glass sheet may contact the stop means and be prevented from movement along the conveyor beyond the stop means. The leading edge of the glass sheet is maintained in contact with the moving stop means for a time period sufficient to permit the glass sheet to be oriented to a desired orientation, after which the correctly oriented glass sheet is permitted to move beyond the stop means.

Compared with the prior art processes, the frontal positioning of a glass sheet according to the invention does not involve the stoppage of the travel of the glass sheet, so that the hot glass is only decelerated on the rollers, so that its optical quality is preserved.

Advantageously, the stop member (stop means) is moved prior to the front end of the glass sheet striking it. This movement is preferably initiated by detection prior to the arrival of a glass sheet, preferably by means of a light barrier, e.g. as known from EP-A-No. 267 850.

Moreover, once the positioning is obtained, the stop member is advantageously accelerated in such a way that it is given a speed higher than that of the conveyor, so that the stop member is disengaged from the glass sheet without any risk of slightly raising the latter which, due to its high temperature, tends to stick to the stop member.

From the time when the stop member is sufficiently removed from the glass sheet, it can be retracted, i.e. vertically displaced from the path of the glass sheet, and is preferably brought at high speed to its initial position, so as to wait for the following glass sheet. This return obviously takes place when the stop member is sufficiently far from the path of the glass sheet to ensure that it does not touch it.

The vertical displacement of the beam for raising the abutments into a top position at the end of a positioning cycle and then back to a bottom position for accepting a new glass sheet is preferably obtained by mounting a roller on an eccentric actuated by a pneumatic rotary jack, preferably with a digital electric control and which is a function of the position of the carriage and its displacement direction.

Preferably, the same motor is used for simultaneously driving the two carriages placed on either side of the conveyor, transmission belts bringing about a rotation of the driving worms or jacks at identical speeds. This motor, which may be positioned beneath the conveyor, is preferably equipped with a speed controller, which makes it possible to move the carriages at a relatively slow constant speed in the conveyor travel direction during positioning and then to speed up in order to disengage the stop member and finally ensure the return movement, preferably at a higher speed than the outward movement, in order to permit high production rates with a short interval between two successive glass sheets.

By definition, when the leading edge of the glass sheet is aligned with the stop member, the latter is perfectly oriented. This stop member may be formed by a single continuous part of the shutter type, or a serious of reciprocally spaced parts of the abutment type. Generally, use is made of two abutments, which have a maximum spacing which is set, taking account of the length of the leading edge and in order to obtain a greater positioning accuracy. Preferably, the mounting of these abutments permits a regulation of their position relative to the beam at least in a direction perpendicular thereto, so as to permit the positioning of sheets whose leading edge is not perpendicular to the conveyor axis. The possibility of regulating the spacing of the abutments is also advantageous. It may be possible to use slide-based mounting arrangements for these settings and adjustments.

DETAILED DESCRIPTION OF THE PREFERRED EMBODIMENTS

FIG. 1 diagrammatically shows a glass sheet 1 traveling in the direction indicated by the arrow F on a conveyor elongated along axis 2 and constituted by a driven roller bed 3. The glass sheet may be ready to enter a cambering station and in particular a station according to FR-A-No. 2 549 465 or FR-A-No.-2 604 992. It has for this purpose been heated to a temperature close to 650° C., which makes it plastic and sensitive to marking by any object coming into contact with it. The rotation of rollers 3 gives the glass a speed V1, e.g. of approximately 20 cm/s.

A beam 4 is positioned above the conveyor parallel to the rollers. To beam 4 are fixed, e.g., by slides, arms 5 carrying stop means in the form of abutments 6,7 which are fixed in sliding manner on arms 5. The abutments 6,7 are upstream in the direction of the glass sheet movement with respect to the beam 4, and a straight line passing through these abutments corresponds to the desired position of the leading edge of the glass sheet.

As can be gathered from FIG. 2, the beam 4 is carried at its end by rails 8,8' positioned on either side of the conveyor and extending parallel to the axis 2. The rails 8,8' run on rollers 9,9' and 10,10' and are driven in translation by means of carriages 11,11'. The carriage 11' is displaced by a threaded shaft 12, extending parallel to rails 8, rotated by means of a belt 13 actuated by a motor placed beneath the conveyor and threadedly held in the carriage. This also applies to carriage 11', so that the beam is driven at the same speed by its two ends.

The rollers 10 and 10' are used for the raising and lowering movement of the beam and the abutments associated therewith. The rollers 9,9' preferably have a fixed height in free rotation. The downstream rollers 10,10' are mounted on eccentrics, e.g. actuated by a rotary pneumatic jack 14. The latter is advantageously actuated by a digital electric control as a function of the position of the carriage and its displacement direction.

The positioning cycle is as follows: in the waiting position, the beam is kept fixed above rollers and at a sufficiently great distance from the conveyor for the abutments to be in the inactive position, i.e., a raised position. When a glass sheet enters the positioning area, it is detected by a contactless detector 15, e.g. a light barrier associated with a photoelectric cell or a camera. The abutments are then lowered to a bottom position, i.e. into the active position, by jacks 14. Simultaneously, or with a time lag fixed as a function of the distance between the detector 15 and the abutments 6,7, the displacement of the beam 4 parallel to the axis 2 of the conveyor starts. Advantageously, the time lag is chosen in such a way that the acceleration phase during which the beam 4 passes from a zero speed to a constant speed V2, is completed by the time when the leading edge of the glass sheet strikes against the first abutment 7.

For overall dimensional reasons, the distance d2 covered by the abutments is limited, so that V2 must be sufficiently small in view of the distance d1 which must be covered during the same time by the portion of the leading edge of the glass sheet furthest, for this back portion to catch up with the abutment 6 which, during the same time, covers distance d2. Conversely, in order to minimize the friction undergone by the glass sheet held by abutment 7, speed V2 should be close to V1. A good compromise is to, e.g., choose a speed V2 less than half the conveyor speed V1.

At the end of the travel, the abutments 6 and 7 must be retracted to enable the glass sheet to continue its travel. To ensure that the glass (which sticks slightly to the abutments due to its high temperature) does not tend to move away from the conveyor at the time when the abutments are raised, this retraction takes place in two stages, namely the abutments are accelerated in order to give them a speed V2' greater than V1 and they are then raised away from the glass, by means of the jacks 14.

The beam carrying the abutments is then brought, preferably at high speed, back into the initial waiting position ready for the positioning of the following glass sheet. In certain cases the glass sheet travel speed is very high, which requires return speeds sometimes well above speed V1.

FIG. 3 is a front view of a conveyor equipped with a positioning system according to the invention. In FIG. 3, the positioning apparatus is shown with the abutments raised. The conveyor is constituted by cylinders 16 placed on rollers 17 mounted on appropriate supports 18. By one of their ends, the cylinders 16 are driven at a speed V1 by pinions 19. The complete conveyor is protected by a cover 20 fixed to a frame, so as to keep the glass sheets at the correct temperature.

The positioning system has a beam 21 mounted above the cylinders 16 and parallel thereto. The beam 21 is preferably provided with two abutments which may be mounted by means of slides, said abutments not being visible in FIG. 3. On either side of the beam 21 are provided brackets 22 on which are fixed the rails 23, 24, rail 23 running on a roller 25. The rail 24 is formed by a triangular part and runs on a roller 26 formed by a grooved wheel, which makes it possible to provide a guidance function. The two rollers 25, 26 are mounted on eccentrics actuated by pneumatic jacks 27.

Moreover, the fixing brackets 22 are fixed to the carriages 28, which slide on an axis normal to the plane of the drawing, as a result of a jack rotated by the belt 29 which, by a set of return pulleys, is mounted to the shaft of a motor 30 fixed to the ground by feet 31.

FIG. 3 also shows that the height of the carriages 28 can be regulated by actuating handles 32, which makes it possible to regulate the distance between the abutments and the conveyor cylinders 16, in order to take into account different thicknesses of the glass sheets.

Advantageously, the beam 21 can also be raised by means of hooks (not shown) fixed to the cover 20, when the latter is raised, e.g., for discharging glass sheets blocked on the conveyor due to problems further down the line, particularly in the shaping station.

The positioning apparatus proposed by the invention makes it possible to greatly limit the intensity of the friction between the glass sheets and the rollers, and therefore the optical quality of the glass plates or windows is improved. Moreover, this apparatus can even function in an installation where the glass sheets closely follow one another, e.g., where they are spaced by less than 50 cm for a travel speed of approximately 20 cm/s, as is the case with the cambering installation known from FR-A No.-2 549 465 and FR-A No.-2 602 992.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. Apparatus for positioning a glass sheet moving on a conveyor, comprising:
    a beam carrying stop means and extending across the conveyor at a position such that a glass sheet moving on the conveyor may contact said stop means and be prevented from movement along the conveyor beyond the stop means; and
    means attached to opposite ends of said beam for moving said beam in the direction of movement of the glass sheet on the conveyor.

2. The apparatus according to claim 1 wherein said means for moving comprise:
    rails on opposite lateral sides of the conveyor, the ends of the beam being mounted to the rails;
    rollers on which said rails move; and
    means for driving said rails along said rollers.

3. The apparatus according to claim 2 wherein said stop means comprise two abutments, including means for moving said beam such that said abutments permit the glass sheet moving on the conveyor to move beyond the abutments.

4. The apparatus according to claim 3 wherein said means for moving said beam such the said abutments permit the glass sheet to move beyond the abutments comprise eccentric means for raising at least some of said rollers away from the conveyor.

5. A process for positioning a glass sheet moving on a conveyor, comprising the steps of:
    moving stop means along the conveyor in the direction of movement of the glass sheet and at a speed lower than that of the glass sheet, said moving stop means being positioned such that a leading edge of the glass sheet may contact said stop means and be prevented from movement along the conveyor beyond the stop means;
    maintaining the leading edge of the glass sheet in contact with the moving stop means for a time period sufficient to permit the glass sheet to be oriented to a desired orientation; and
    permitting the correctly oriented glass sheet to move beyond the stop means.

6. The process according to claim 5 wherein said stop means move at a constant speed during said time period.

7. The process according to claim 6 including the step of accelerating the stop means to said constant speed prior to said time period.

8. The process according to claim 6 including the step of retracting said stop means in a direction opposite the direction of movement of the glass sheet, and at a speed greater than that of the glass sheet, after said step of permitting the glass sheet to move beyond the stop means.

9. The process according to claim 8 wherein said step of permitting the correctly oriented glass sheet to move beyond the stop means comprises:
    accelerating the stop means beyond said constant speed at the end of said time period; and
    raising the accelerated stop means away from the conveyor.

10. The process according to claim 9 including the step of lowering the raised stop means toward the conveyor after said retracting step.

11. The process according to claim 6 wherein said constant speed is less than one half of the conveyor speed.

* * * * *